(12) United States Patent
Fauver et al.

(10) Patent No.: US 7,811,825 B2
(45) Date of Patent: *Oct. 12, 2010

(54) SYSTEM AND METHOD FOR PROCESSING SPECIMENS AND IMAGES FOR OPTICAL TOMOGRAPHY

(75) Inventors: Mark E. Fauver, Seattle, WA (US); J. Richard Rahn, Sammamish, WA (US); Eric J. Seibel, Seattle, WA (US); Alan C. Nelson, Gig Harbor, WA (US)

(73) Assignees: University of Washington, Seattle, WA (US); VisionGate, Inc., Gig Harbor, WA (US)

( * ) Notice: Subject to any disclaimer, the term of this patent is extended or adjusted under 35 U.S.C. 154(b) by 1534 days.

This patent is subject to a terminal disclaimer.

(21) Appl. No.: 10/964,508

(22) Filed: Oct. 13, 2004

(65) Prior Publication Data

US 2005/0085721 A1    Apr. 21, 2005

Related U.S. Application Data

(63) Continuation-in-part of application No. 10/716,744, filed on Nov. 18, 2003, now Pat. No. 7,738,945.

(51) Int. Cl.
    *G01N 33/48* (2006.01)
(52) U.S. Cl. .................. 436/63; 250/234; 356/444; 382/133; 600/425; 600/473
(58) Field of Classification Search .................. 436/63; 250/234; 600/473, 425; 356/444; 382/133
    See application file for complete search history.

(56) References Cited

U.S. PATENT DOCUMENTS 3,470,373 A    9/1969    Brewer (Continued)

FOREIGN PATENT DOCUMENTS

JP    02085747 A    3/1990

(Continued)

OTHER PUBLICATIONS

Kikuchi, S. et al., "Three-dimensional computed tomography for optical microscopes," Optics Communications 107 (1994) 432-444.

(Continued)

*Primary Examiner*—Long V Le
*Assistant Examiner*—Ellsworth Weatherby
(74) *Attorney, Agent, or Firm*—Citadel Patent Law; George A Leone

(57) ABSTRACT

A scanning method for scanning samples of biological cells using optical tomography includes preparing, acquiring, reconstructing and viewing three-dimensional images of cell samples. Concentration and enrichment of the cell sample follows. The cell sample is stained. Cells are isolated from the cell sample and purified. A cell/solvent mixture is injected into a gel by centrifugation. A cell/gel mixture is injected into a capillary tube until a cell appears centered in a field of view using a stopped-flow method. An optical imaging system, such as a fixed or variable motion optical tomography system acquires a projection image. The sample is rotated about a tube axis to generate additional projections. Once image acquisition is completed, the acquired image projections are corrected for errors. A computer or other equivalent processor is used to compute filtered backprojection information for 3D reconstruction.

16 Claims, 10 Drawing Sheets

U.S. PATENT DOCUMENTS

| | | | |
|---|---|---|---|
| 3,497,690 A | 2/1970 | Wheeless, Jr. | |
| 3,598,471 A | 8/1971 | Baldwin | |
| 3,657,537 A | 4/1972 | Wheeless, Jr. | |
| 3,748,468 A | 7/1973 | Hartman | |
| 3,833,762 A | 9/1974 | Gudmundsen | |
| 3,960,449 A | 6/1976 | Carlton | |
| 3,999,047 A | 12/1976 | Green | |
| 4,175,860 A | 11/1979 | Bacus | |
| 4,183,623 A | 1/1980 | Haines | |
| 4,200,353 A | 4/1980 | Hoffman | |
| 4,293,221 A | 10/1981 | Kay | |
| 4,360,885 A | 11/1982 | Edgar | |
| 4,657,676 A | 4/1987 | Keary | |
| 4,858,128 A | 8/1989 | Nowak | |
| 4,873,653 A | 10/1989 | Grosskopf | |
| 4,891,829 A | 1/1990 | Deckman | |
| 4,966,576 A | 10/1990 | Schulz | |
| 5,141,609 A | 8/1992 | Sweedler et al. | |
| 5,148,502 A | 9/1992 | Tsujiuchi et al. | |
| 5,281,517 A | 1/1994 | Bacus et al. | |
| 5,308,990 A | 5/1994 | Takahashi et al. | |
| 5,312,535 A | 5/1994 | Waska et al. | |
| 5,321,501 A | 6/1994 | Swanson et al. | |
| 5,402,460 A | 3/1995 | Johnson | |
| 5,428,447 A | 6/1995 | Toida | |
| 5,630,938 A | 5/1997 | Feller | |
| 5,668,887 A | 9/1997 | Parker et al. | |
| 5,676,631 A | 10/1997 | Kunz | |
| 5,680,484 A * | 10/1997 | Ohyama et al. | 382/255 |
| 5,710,429 A | 1/1998 | Alfano et al. | |
| 5,741,411 A | 4/1998 | Yeung et al. | |
| 5,760,901 A | 6/1998 | Hill | |
| 5,760,951 A | 6/1998 | Dixon et al. | |
| 5,828,408 A | 10/1998 | Mottin et al. | |
| 5,848,123 A | 12/1998 | Strommer | |
| 5,878,103 A | 3/1999 | Sauer et al. | |
| 5,880,838 A | 3/1999 | Marx et al. | |
| 5,909,476 A | 6/1999 | Cheng et al. | |
| 5,915,048 A | 6/1999 | Hill et al. | |
| 5,987,158 A | 11/1999 | Meyer | |
| 6,002,480 A * | 12/1999 | Izatt et al. | 356/479 |
| 6,005,617 A | 12/1999 | Shimamoto et al. | |
| 6,026,174 A | 2/2000 | Palcic | |
| 6,037,579 A | 3/2000 | Chan et al. | |
| 6,038,067 A | 3/2000 | George | |
| 6,047,080 A | 4/2000 | Chen et al. | |
| 6,072,624 A | 6/2000 | Dixon et al. | |
| 6,091,983 A | 7/2000 | Alfano et al. | |
| 6,130,958 A | 10/2000 | Rohler et al. | |
| 6,165,734 A | 12/2000 | Garini | |
| 6,201,628 B1 | 3/2001 | Basiji | |
| 6,211,955 B1 | 4/2001 | Basiji | |
| 6,215,587 B1 | 4/2001 | Alfano et al. | |
| 6,248,988 B1 * | 6/2001 | Krantz | 250/201.3 |
| 6,249,341 B1 | 6/2001 | Basiji | |
| 6,251,586 B1 | 6/2001 | Mulshine | |
| 6,251,615 B1 | 6/2001 | Oberhardt | |
| 6,252,979 B1 | 6/2001 | Lee | |
| 6,312,914 B1 | 11/2001 | Kardos et al. | |
| 6,388,809 B1 | 5/2002 | MacAulay | |
| 6,452,179 B1 | 9/2002 | Coates et al. | |
| 6,485,413 B1 * | 11/2002 | Boppart et al. | 600/160 |
| 6,519,355 B2 | 2/2003 | Nelson | |
| 6,522,775 B2 | 2/2003 | Nelson | |
| 6,529,614 B1 | 3/2003 | Chao et al. | |
| 6,591,003 B2 | 7/2003 | Chu | |
| 6,636,623 B2 | 10/2003 | Nelson | |
| 6,640,014 B1 | 10/2003 | Price et al. | |
| 6,697,508 B2 | 2/2004 | Nelson | |
| 6,741,730 B2 | 5/2004 | Rahn | |
| 6,755,969 B2 | 6/2004 | Kirker | |
| 6,770,893 B2 | 8/2004 | Nelson | |
| 2001/0012069 A1 | 8/2001 | Derndinger et al. | |
| 2002/0045525 A1 | 4/2002 | Marziali | |
| 2002/0161534 A1 | 10/2002 | Adler et al. | |
| 2002/0173034 A1 | 11/2002 | Barbera-Guillem | |
| 2003/0049841 A1 * | 3/2003 | Short et al. | 435/449 |
| 2003/0222197 A1 | 12/2003 | Reese | |
| 2004/0001618 A1 | 1/2004 | Johnson | |
| 2004/0008515 A1 | 1/2004 | Brown | |

FOREIGN PATENT DOCUMENTS

| | | |
|---|---|---|
| JP | 10260131 A | 9/1998 |
| JP | 2000121550 A | 4/2000 |
| WO | WO 02/095476 A2 | 11/2002 |

OTHER PUBLICATIONS

Kikuchi, S. et al., "Three-dimensional microscopic computed tomography based on general Radon transform for optical imaging systems," Optics Communications 123 (1996).

Matula, P. et al. "Precise 3D image alignment in micro-axial tomography," Journal of Microscopy, vol. 209, Pt. 2 (Feb. 2003) pp. 126-142.

Ong, SH, Development of an imaging flow cytometer. Anal Quant Cytol Histol 9(5)pp. 375-382, 1987.

Gilbert, P, "Iterative Methods for the Three dimensional Reconstruction of an Object from Projections," Journal of Theoretical Biology 36pp. 105-117, 1972.

Oppenheim, BE, More Accurate Algorithms for Iterative 3 dimensional Reconstruction, IEEE Transactions on Nuclear Science NS-21pp. 72-77, 1974.

Singer, JR, Grunbaum, FA, Kohn, P, and Zubelli, JP, "Image Reconstruction of the Interior of Bodies that Diffuse Radiation," Science 248(4958)pp. 990-993, 1990.

Mueller, K and Yage, R, "Rapid 3-D Cone-beam Reconstruction with the Simultaneous Algebraic Reconstruction Technique (SART) Using 2-D Texture Mapping Hardware", IEEE Transactions on Medical imaging 19(12)pp. 1227-1237, 2001.

Bellman, SH, Bender, R, Gordon, R, and Rowe, JE, "ART is Science being a Defense of Algebraic Reconstruction Techniques for Three dimensiional Electron Microscopy," Journal of Theoretical Biology 32pp. 205-216, 1971.

Manglos, SH, Jaszcak, RJ, and Floyd, CE, "Maximum Likelihood Reconstruction for Cone Beam SPECT: Development and Initial Tests," Physics in Medicine and Biology 34(12)pp. 1947-1957,1989, #1382.

Manglos; SH, Gagne, GM, Krol A, Thomas, FD, and Narayanaswamy, R, "Transmission Maximum-likelihood Reconstruction with Ordered Subsets for Cone Beam CT", Physics in Medicine and Biology 40(7)pp. 1225-1241, 1995, #4389.

Hampel, U and Freyer, R, "Fast Image Reconstruction for Optical Absorption Tomography in Media with Radially Symmetric Boundaries", Medical Physics 25 (1)pp. 92-101, 1998.

Jiang, H, Paulsen, KD, and Osterberg, UL, "Frequency-domain Near-infrared Photo Diffusion Imaging: Initial Evaluation in Multitarget Tissuelike Phantoms", Medical Physics 25(2)pp. 183-193, 1998.

Herman, G, *Image Reconstruction from Projections: The Fundamentals of Computerized Tomography*, Academic Press, New York, 1980.

Paulsen, KD and Jiang, H, "Spatially Varying Optical Property Reconstruction Using a Finite Element Diffusion Equation Approximation", Medical Physics 22(691-701) 1995.

Farichild Imaging, Preliminary Data Sheet CCD525, TDI, Time Delay and Integration Sensor, Jan. 12, 2001.

Farichild Imaging, Preliminary Data Sheet CCD582, TDI, Time Delay and Integration Sensor, Jan. 18, 2000.

Shapiro, HM, *Practical Flow Cytometry*, $3^{rd}$ ed., Wiley-Liss, 1995.

HJ Tiziani and MI Uhde, Three-dimensional analysis by a microlens array confocal arrangements (*Applied Optics* 33, 567 [1994]).

Bayat, S, Le Duc, G, Porra, L, Berrruyer, G, Nemoz, C, Monfraix, S, Fiedler, S, Thomlinson, W, Suortti, P, Standertskjold-Nordenstam, CG, and Sovijarvi, ARA, "Quantitative Functional Lung Imaging with Synchrotron Radiation Using Inhaled Xenon as Contrast Agent", Physics in Medicine and Biology 46(3287-99) 2001.

Bentley, MD, Ortiz, MC, Ritman, EL, and Romero, JC, "The Use of Microcomputed Tomography to Study Microvasculature in Small Rodents", American Journal of Physiology (Regulatory Integrative Comp Physiol) 282(R1267-R1279) 2002.

Cheng, PC, Lin, TH, Wang, G, Shinozaki, DM, Kim, HG, and Newberry, SP, "Review on the Development of Cone-beam X-ray Microtomography", Proceedings of the X-ray Optics and Microanalysis 1992, Institute of Physics Ser. No. 130, Kenway, PB, et al. (eds.), Manchester, UK, Aug. 31-Sep. 4, 1992, pp. 559-566.

Defrise, M, Clack, R, and Townsend, DW, "Image Reconstruction from Truncated, Two-dimensional, Parallel Projections", Inverse Problems 11(287-313) 1995.

Defrise, M, Noo, F, and Kudo, H, "A Solution to the Long-object Problem in Helical Cone-beam Tomography", Physics in Medicine and Biology 45(623-43) 2000.

Endo, M, Tsunoo, T, Nakamori, N, and Yoshida, K, "Effect of Scattered Radiation on Image Noise in Cone Beam CT", Medical Physics 28(4) (469-74) 2001.

Jorgensen, SM, Demirkaya, O, and Ritman, EL, "Three Dimensional Imaging of Vasculature and Parenchyma in Intact Rodent Organs with X-ray Micro-CT", Am. J. Physiology 275(Heart Circ. Physiol. 44) pp. H1103-H1114, 1998.

Kinney, JH, Johnson, QC, Saroyan, RA, Nichols, MC, Bonse, U, Nusshardt, R, and Pahl, R, "Energy-modulated X-ray Microtomography", Rev. Sci. Instrum. 59(1)pp. 196-197, 1988.

Kinney, JH and Nichols, MC, "X-ray Tomographic Microscopy (XTM) Using Synchrotron Ratiation", Annu. Rev. Mater. Sci. 22pp. 121-152, 1992.

Taguchi, K and Aradate, H, "Algorithm for Image Reconstruction in Multi-slice Helical CT", Medical Physics 25(4) pp. 550-561, 1998.

Yu, DF, Fessler, JA, and Ficaro, EP, "Maximum-Likelihood Transmission Image Reconstruction for Overlapping Transmission Beams", IEEE Transactions on Medical Imaging 19(11)pp. 1094-1105, 2000.

Sharpe, J, Ahlgren, U et al., "Optical Projection Tomography as a Tool for 3D Microscopy and Gene Expression Studies," Science, vol. 296, pp. 541-545, Apr. 19, 2002.

Sharpe, J, review, "Optical Projection Tomography as a New Tool for Studying Embryo Anatomy," *J. Anat.* (2003), pp. 175-181.

RH Anderson, "Close-up imaging of documents and displays with lens arrays," *Applied Optics* 18, 477 (1979).

Kak, A.C. and Slaney, M., *Principles of Computerized Tomographic Imaging*, IEEE Press, New York, 1988.

E.G. Steward, *Fourier Optics: An Introduction*, 2nd ed. (Halsted Press, New York, 1987).

A. Klug and J.L. Finch, "Structure of viruses of the papilloma-polyoma type," J. Mol. Biol., vol. 37, p. 1 (1968).

A. Klug, "Image analysis and reconstruction in the electron microscopy of biological macromolecules," Chem. Scripta, vol. 14, p. 245 (1978).

T.C. Wedberg and J.J. Stamnes, "Recent results in optical diffraction microtomography," Meas. Sci. Technol., vol. 7, p. 414 (1996).

Y. Li, et al., "Comparison of analog and digital Fourier transforms in medical image analysis," J. Biomed. Optics, vol. 7, p. 255 (2002).

Y. Xu et al., "Three-dimensional diffuse optical tomography of bones and joints," J. Biomed. Optics, vol. 7, p. 88 (2002).

H. Banda-Gamboa et al., "Spectral-Analysis of Cervical Cells Using the Discrete Fourier-Transform," Anal. Cell. Path., vol. 5(2), pp. 85-102 (1993).

D.E. Burger, et al., "Extraction of Morphilogical Features from Biological Models and Cells by Fourier Analysis of Static Light Scatter Measurements," Cytometry, vol. 2, No. 5, pp. 327-336 (1982).

M. Rozycka, et al., "Optical Diffraction as a Tool for Semiautomatic, Quantitative Analysis of Tissue Specimens," Cytometry, vol. 2, No. 4, pp. 244-248 (1982).

W.H. Press et al., *Numerical Recipes in C* (New York: Cambridge University Press, 1988).

Almeida and Fuji, Fourier transform differences and averaged simularities in diatoms, Applied Optics, vol. 18, No. 10, pp. 1663-1667, (1979).

Smolinska and Dawidowicz, "Extraction of common or different part from optical images,", Institute of Physics, Warsaw Technical University, 222-223.

Miles, CP, Jaggard, DL, "The Use of Optical Fourier Transforms to Diagnose Pleomorphism, Size and Chromatin Clumping in Nuclear Models," Anal Quant Cytol Histol vol. 3, No. 2, pp. 149-156, 1981.

Dziedzic-Goclawska, et al., "Application of the Optical Fourier Transform for Analysis of the Spatial Distribution of Collagen Fibers in Normal and Osteopetrotic Bone Tissue," Histochemistry (1982) 74:123-137.

Ostrowski, et al., "Application of Optical Diffractometry in Studies of Cell Fine Structure," Histochemistry (1983) 78:435-449.

Mareel, MM, et al., "Numerical Evaluation of Changes in the Cytoplasmic Microtubule Complex of C3H Mouse Cells by Optical Diffractometry and of Changesin Cell Shape by Fourier Analysis," Cytometry 7:18-24 (1986).

Bem, W, et al., "Modification of Chromatin Pattern in the Course of Terminal Differentiation During Human Granulocytopiesis: Optical Diffractometry Study," Cellular and Molecular Biology 33(5), 563-571 (1987).

Rozycka, M, et al., "Analysis of chromatin pattern in blood lymphocytes of healthy donors and in lymphoid cells of patients with chronic lymphocytic leukaemia," J. Clin. Pathol. 1988:41:504-509.

George, JS et al., "Virtual Pinhole Confocal Microscope," Physics Division Progress Report, www.lanl.gov/p/pdfs/papp_pinhole.pdf, (1999-2000).

Pawley, JB, *Handbook of Biological Confocal Microscopy*, Plenum Press, NY, 479-490 (1995).

Schmitz, "Perfomance Characteristics of a Silicon Photodiode (SiPD) Based Instrucment for Fast Functional Optical Tomography," undated, SUNY Downstate Medicial Center Brooklyn, NY.

Schmitz, "Instrumentation for Real-Time Dynamic Optical Tomography," undated, SUNY Downstate Medicial Center Brooklyn, NY.

\* cited by examiner

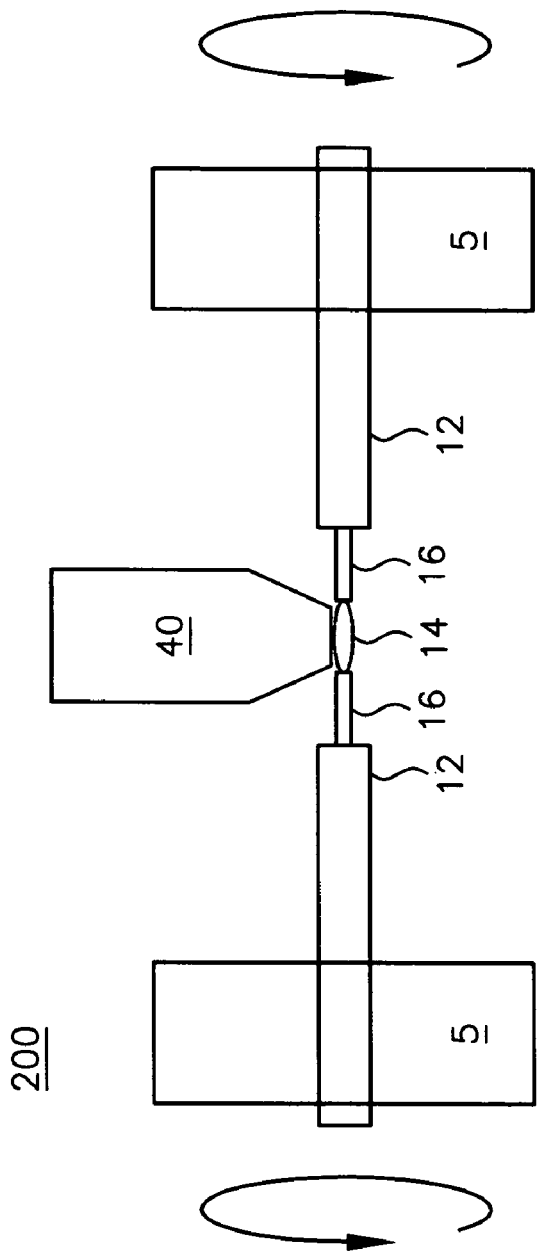
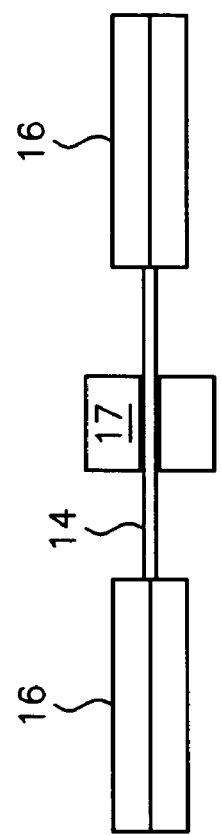

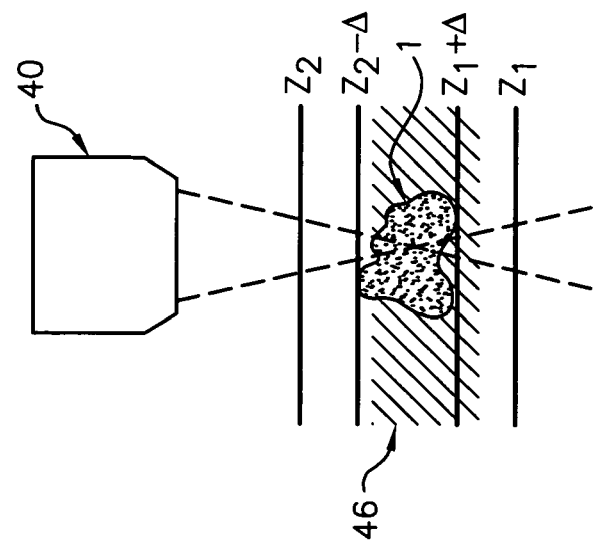
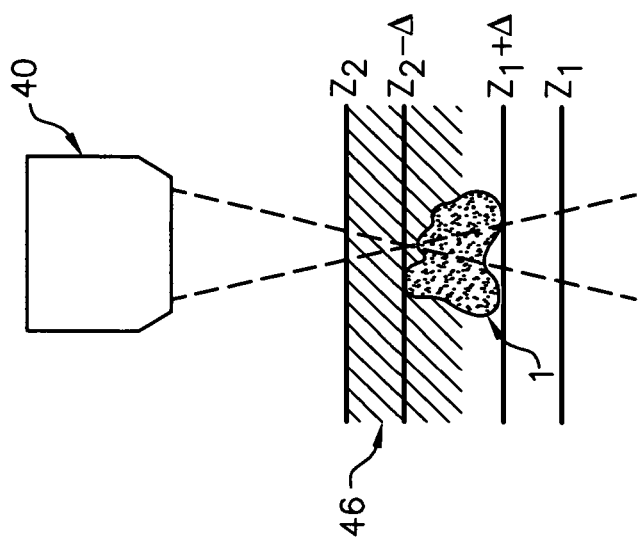
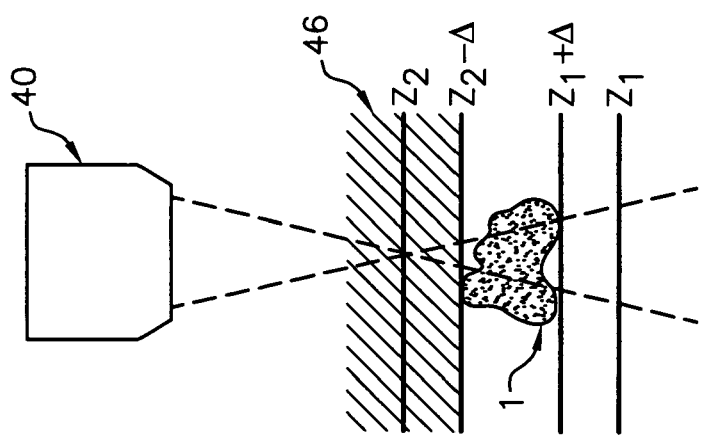

SYSTEM AND METHOD FOR PROCESSING SPECIMENS AND IMAGES FOR OPTICAL TOMOGRAPHY

RELATED APPLICATIONS

This application claims the benefit of the priority date and is a continuation-in-part of U.S. patent application Ser. No. 10/716,744, filed Nov. 18, 2003, now U.S. Pat. No. 7,738, 945, of Fauver et al. entitled "METHOD AND APPARATUS OF SHADOWGRAM FORMATION FOR OPTICAL TOMOGRAPHY," which is a continuation-in-part of U.S. patent application Ser. No. 10/126,026, filed Apr. 19, 2002, now U.S. Pat. No. 7,197,355, of Nelson entitled "VARIABLE-MOTION OPTICAL TOMOGRAPHY OF SPECIMEN PARTICLES," the disclosures of both of which are incorporated herein by this reference.

FIELD OF THE INVENTION

The present invention relates generally to the field of imaging specimens and, more particularly, to imaging specimens using optical tomography.

BACKGROUND OF THE INVENTION

Fauver et al. teaches an optical imaging system that generates pseudoprojection images from multiple views of a specimen, such as a biological cell. Careful preparation of samples is required prior to initiating optical imaging. To generate a pseudoprojection for each view, the microscope objective lens is scanned in a linear direction that is orthogonal to the central axis of the capillary tube or cylindrical sample volume. To generate multiple pseudoprojections at different views, the cylindrical sample is rotated about its central axis and the procedure for taking a pseudoprojection is repeated. The cylindrical sample used is a line of single cells that are held in a refractive-index-matching gel within a microcapillary tube. In other embodiments, such as disclosed in Fauver et al., the microscope objective is scanned by moving it in a range approximating the tube's inner diameter, at a frequency of less than 100 Hz, using commercially available single axis scanners. A method for substantially increased specimen scanning would be advantageous since scanning an objective lens is a significant rate-limiting step for imaging cells using pseudoprojection technology.

Since standard optical microscope objective lenses are much larger and heavier than a typical cylindrical sample that may be composed of, for example, cells embedded within a rigid polymer thread, one purpose of the present invention is to scan the sample and not the significantly more massive objective lens. Optical fibers of the same material, such as fused silica and size, for example, on the order of 125 microns diameter, can be moved at resonance in the 10 kHz frequency range. As a result, single axis scanning speed may be increased up to 100 times over the previous embodiments using the techniques of the present invention.

In 3D imaging for optical tomography there is a need for improving the image quality of a projection image acquired from a thick sample. There are a number of detrimental optical aberrations that degrade images including:

(a) lateral smearing of the image due to inherent optical system limitations which occurs even for thin specimens;
(b) lateral blurring of the image due to the contributions from the out-of-focus portions of the specimen which is not an issue for thin specimens;
(c) artifactual smearing of the image in the plane perpendicular to the axis of rotation due to using a tomographic backprojection reconstruction algorithm; and
(d) loss of sensitivity when some regions of the volume contain no features.

Lateral smearing of the image, also known as diffraction degradation, is typically present in optical systems. It is described by the system modulation transfer function (MTF). Lateral smearing is a function of, among other things, diffraction through the system's aperture, lens aberrations, and detector pixel size. Typically, it is corrected by measuring a two-dimensional point-spread function (2D PSF) for the system, and deconvolving the image with the 2D PSF electronically in post-acquisition processing.

Lateral blurring, also referred to herein as defocus blurring, is typically present for any sample with a finite thickness. As with lateral smearing, lateral blurring is usually corrected in post-acquisition processing, if at all.

Artifactual smearing is a result of using a backprojection technique in computing a 3D reconstruction of the image as taught, for example, in Fauver et al. A backprojection algorithm typically operates to spread the measured image along the optical axis. If backprojection is done from a large number of observation angles, the PSF becomes artificially smeared.

Loss of sensitivity, or biasing, is unique to optical tomography, as it results from focusing in planes that contain no features. Focusing on such regions may be unavoidable as where the location of an object of interest cannot be readily determined a priori. One such example includes a case where a cell has a diameter of about ten microns, residing within a much larger microcapillary tube, typically having a diameter of about 40 microns. The result is an increase in the DC or zero-spatial frequency component in the image's power spectrum, unaccompanied by any increase of the non-zero spatial frequencies. For a camera with a limited dynamic range (i.e., limited bits of resolution), features become less distinguishable as more and more of them share the same gray-level in an acquired image.

Lateral smearing, lateral blurring, and artifactual smearing of the image can be corrected using post processing software, albeit with some loss of precision when the data acquired is digitized to a finite number of bits. However, loss of sensitivity is more difficult to correct in software, because once the measurement precision is lost, it cannot be readily restored without a priori knowledge. The present invention provides for the first time a method for analog pre-processing of projection images wherein a spatial filter mask, having appropriate optical densities distributed over its surface, is placed in one or more Fourier planes (i.e., aperture stops) of an optical system.

SUMMARY OF THE INVENTION

The present invention provides a scanning method for scanning samples of biological cells using optical tomography. Steps included in preparing, acquiring, reconstructing and viewing three-dimensional images begin with collecting cell samples. Concentration and enrichment of the cell sample follows. The cell sample is stained. Cells are isolated from the cell sample and purified. A cell/solvent mixture is injected into a gel by centrifugation. A cell/gel mixture is injected into a capillary tube until a cell appears centered in a field of view using a stopped-flow method or the like. An optical imaging system, such as, for example, a fixed or variable motion optical tomography system acquires a projection image. The sample is rotated about a tube axis to generate additional projections. Once the image acquisition of a sample is completed, the acquired shawdowgrams or image projections are corrected for errors. A computer or other equivalent processor is used to compute filtered back-projection information for 3D reconstruction.

The invention further provides a scanning system for scanning a sample, wherein the sample includes a series of objects within a container. The scanning system comprises a pseudo-projection viewing subsystem for imaging the objects, wherein the pseudo-projection viewing subsystem includes a fixed objective lens; and a plurality of mechanical scanning components mounted to engage opposing sides of the sample proximate to the fixed objective lens so as to vibrate the sample to allow the sample to be axially scanned by the fixed objective lens.

The invention further provides a scanning apparatus comprising a pair of synchronized stepper motors, a microscope objective, a pair of mounting fixtures, a sample, and a pair of piezotubes. The pair of stepper motors operates to rotate the sample and the piezotubes are coupled at opposing ends of the sample to vibrate the sample so as to enable the objective lens to axially scan the sample.

The invention also provides a system for pre-processing projection images from a sample including objects of interest. The system comprises a light source where a portion of the sample is located to be illuminated by the light source. At least one objective lens having a Fourier plane, is located to receive light rays passing through the portion of the sample. A spatial filter mask is located in the Fourier plane. At least one detector located to receive radiation from the sample when the sample is illuminated. A computer including an image analysis algorithm for producing three-dimensional images, receives imaging information from the at least one detector.

The invention also provides a method for pre-processing projection images from a sample including objects of interest. The method comprises the steps of:

illuminating a portion of the sample;

using at least one objective lens having a Fourier plane receive light rays passing through the portion of the sample;

filtering light rays transmitted through the at least one objective lens with a spatial filter mask located in the Fourier plane to generate spatially filtered light;

detecting the spatially filtered light to generate imaging information; and producing three-dimensional images from the imaging information using a computer including an image analysis algorithm.

The invention further provides a method for preparing samples of biological cells for analysis comprising the steps of:

concentrating and enriching a cell sample;

staining the cell sample;

isolating cells from the cell sample;

purifying the isolated cells; and injecting a cell/solvent mixture into a gel to produce a cell/gel mixture.

BRIEF DESCRIPTION OF THE DRAWINGS

FIG. 3 illustrates a side view of a scanning apparatus for optical tomography as contemplated by an alternate embodiment example of the current invention.

FIG. 4 illustrates a top view of the scanning apparatus for optical tomography as shown in FIG. 3.

FIG. 7A-FIG. 7C illustrate an example embodiment of the invention where the objective lens moves along the optical axis, with the object of interest is within the range of elevations focused by the moving objective lens.

While the novel features of the invention are set forth with particularity in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

The method and apparatus of the invention is here described with reference to specific examples that are intended to be illustrative and not limiting. The method and apparatus of the invention is amenable to additional features such as matching of the refractive indices of the materials in the samples and the inclusion of microscopic barcodes to facilitate identification and tracking.

Figure 1:
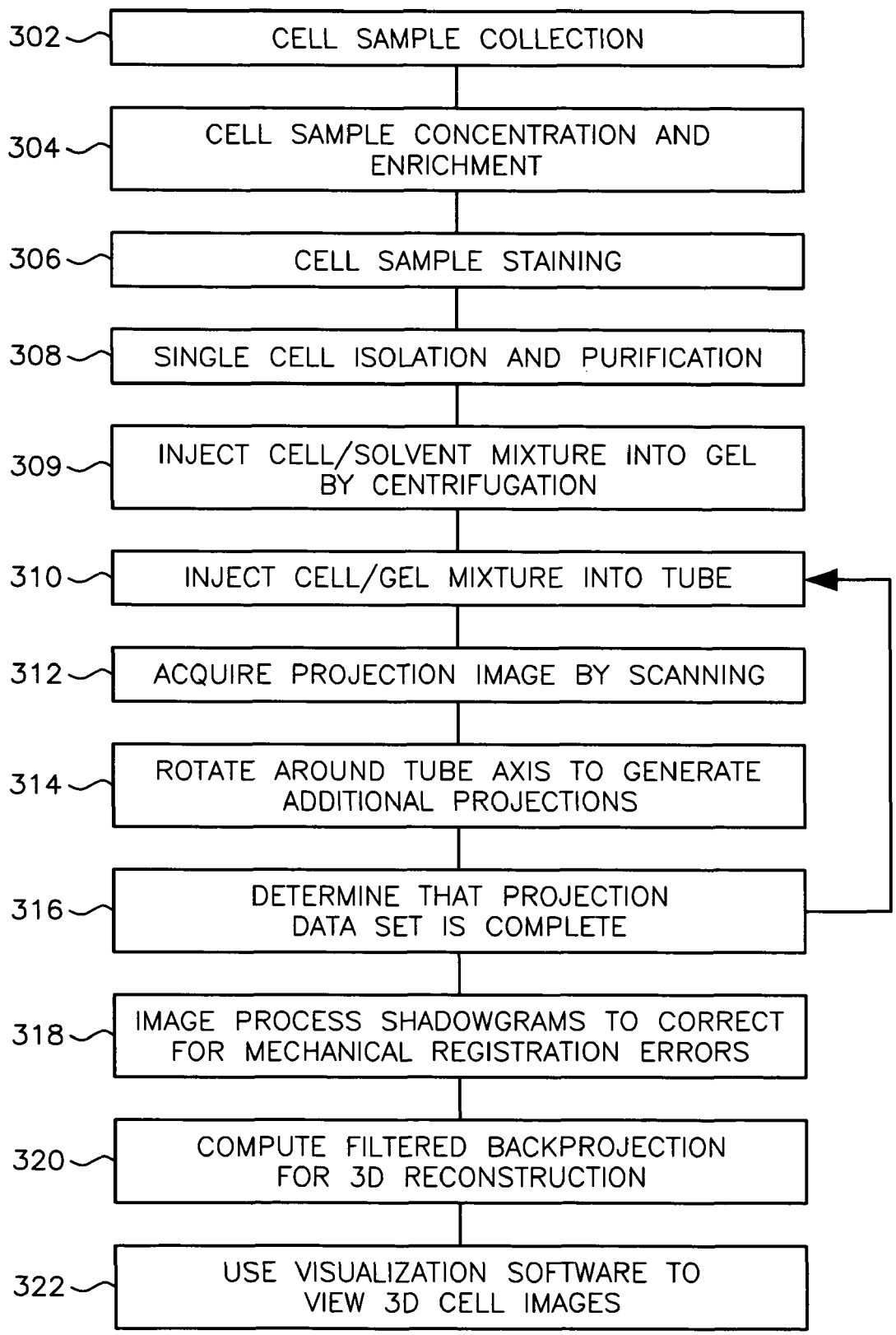
FIG. 1 illustrates a schematic view of a high level flow diagram of a scanning system and method for scanning samples using optical tomography as contemplated by one example embodiment of the current invention.

Referring now to FIG. 1, a schematic view of a high level flow diagram of a scanning system and method for scanning samples using optical tomography as contemplated by one example embodiment of the current invention is illustrated. As typically implemented, the steps may include a combination of manual operations, as in sample collection, and automated processing, as in using reconstruction algorithms or equivalent types of operations including combinations of manual and automated operations. Steps included in preparing, acquiring, reconstructing and viewing three-dimensional images begin with step 302, collecting cell samples. Concentration and enrichment of the cell sample follows at step 304. At step 306 the cell sample is stained. At step 308 cells are isolated from the cell sample and purified. At step 309 a cell/solvent mixture is injected into a gel by centrifugation. At step 310 a cell/gel mixture is injected into a capillary tube until a cell appears centered in a field of view using a stopped-flow method or the like. At step 312 an optical imaging system, such as, for example, a fixed or variable motion optical tomography system acquires a projection image. At step 314 the sample is rotated about a tube axis to generate additional projections. At step 316 a determination is made as to whether the projection data set is complete and, if not, steps 310-316 are repeated for the next object of interest while a count of acquired sample images is maintained.

Once the image acquisition of a sample is completed, the acquired shawdowgrams or image projections are corrected for mechanical registration errors at step 318. A computer or other equivalent processor is used to compute filtered back-projection information for 3D reconstruction at step 320. At step 322 visualization software or equivalent systems may be used to view the 3D cell images, or the images may be analyzed without actual viewing.

In previous practice, cells not held in a gel mixture show a marked tendency to adhere to the glass surface of a capillary tube. The present invention provides a method of the invention for providing a cell/gel mixture wherein the gel substantially lubricates cells to reduce the tendency to adhere to the glass surface. Further, because specimen retrieval using this method is very high, the opportunities for cross contamination of the specimen are substantially reduced. In one embodiment the cell/gel mixture comprises at least one cell embedded in a liquid having a viscosity >1 million cps and/or at least one cell embedded in a thixotropic gel.

Fast Sample-scanning for Pseudoprojection Technology for 3D Imaging of Cells

Figure 2:
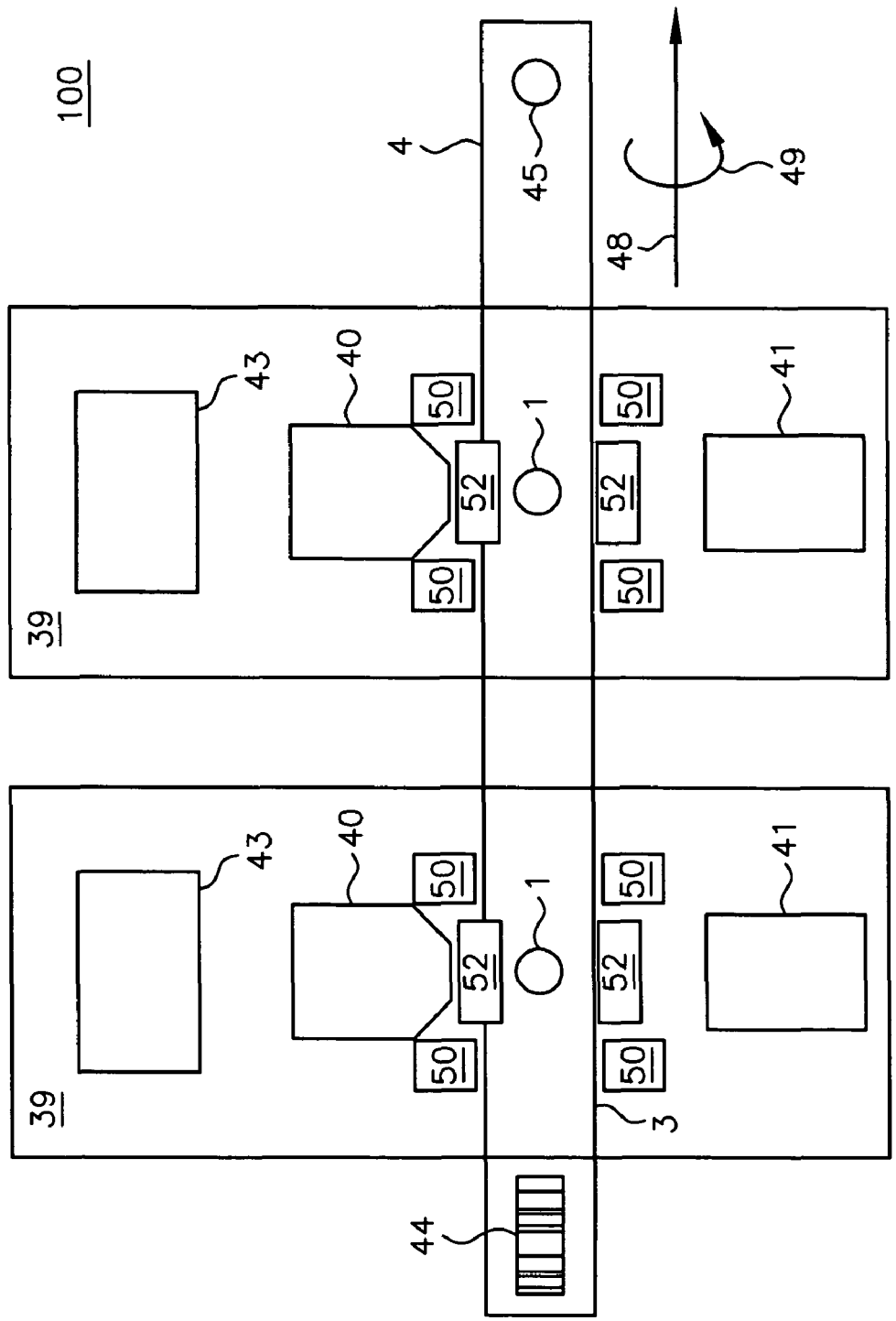
FIG. 2 illustrates a schematic view of a fast-sample scanning system for optical tomography as contemplated by one example embodiment of the current invention.

Referring now to FIG. 2, a side view of a fast-sample scanning apparatus for optical tomography including a specimen scanning system 100 as contemplated by one example embodiment of the current invention is shown. The specimen scanning system 100 employs multiple sets of pseudo-projection viewing subsystems 39 along a sample 4. The sample 4 may comprise a series of objects 1 within a semi-rigid medium such as an extruded thread 3, cell beads, a capillary tube, frozen liquid stream or other equivalent medium. A set of piezoelectric pushers 50 is mounted to engage opposing sides of the semi-rigid medium 3, close to the objective lens 40 so as to vibrate the semi-rigid medium 3 and the object 1 within it, to allow the object 1 to be axially scanned by the fixed objective lens 40. Herein, "to scan" or "scanning" as applied to a sample 4 or object 1 is used to denote acquiring a plurality of images or allowing the imaging system to acquire a series of images by vibrating or otherwise moving the object 1 through an axial range.

A plurality of objects 1 may include, for example, particles such as cells or nuclei. One or more fiducials 45 for registration may also be embedded or otherwise mounted on or in the semi-rigid medium 3. Each of the multiple sets of pseudo-projection viewing subsystems 39 include an image detector 43 such as a CCD or CMOS camera, disposed to receive image information from an objective lens 40, illuminated by an illumination system 41. Objective 40 may preferably be a fixed objective lens. More than one objective lens 40 is shown because the system 100 can be operated using multiple viewing subsystems 39. In addition, multiple objective lenses may be positioned non-orthogonally to the sample, so pseudoprojection images from varying angles can be acquired in parallel from a single object 1. Since the motion of the semi-rigid medium 3 is very small compared to its freestanding length, there is no appreciable material fatigue because the amount of strain is very low. Therefore, the viewing subsystems 39 do not have to induce vibrations along parallel axes of the semi-rigid medium 3. In a preferred embodiment, the system may advantageously be located in a clean-room environment to reduce the chance of particulates being pushed against the imaging surface of the semi-rigid medium 3 and possibly introducing microcracks. To allow for an increase in scanning rates, greater optical illumination and/or flash illumination may be required along with increases in rotation speeds using dual stepper motors 5. Furthermore, the rotational motion of the semi-rigid medium 3 may be continuous, but at a much lower frequency than its vibrational motion.

Each object 1 moves through various stations of multiple sets of pseudo-projection viewing subsystems 39 along the direction indicated by arrow 48. Each fiducial 45 aids in detecting specimen positioning and positional shifts during translation and/or rotation, and may be used with automatic image registration techniques on the images being integrated on the image detector, or on individual images that are being summed for a single integration by the computer. To allow its use as a reference for both translations and rotation, the fiducial 45 may be an opaque, fluorescent, or half-silvered microsphere or equivalent component. The registration of the multiple projections of viewed objects is corrected as the semi-rigid medium 3 is rotated as indicated by arrow 49. In contrast to other techniques, the present invention moves the specimen with respect to the objective lens to scan the focal plane continuously and sums the images optically at the detector, and is not restricted to summing individual images acquired and summed only electronically. If the objective lens uses oil-immersion, then a thin layer of oil 54, covering the outer surface of the semi-rigid medium 3, may be used to reduce friction and to reduce the mismatch of refractive index. Unique indicia 44, such as a micro-barcode, may be placed to identify and to maintain a chain of custody for each of the plurality of specimens.

In operation, system 100 may be characterized as a fixed-fixed cantilever geometry that can be vibrated by piezoelectric pushers 50. The piezoelectric pushers 50 in one useful embodiment may be mounted to engage opposing sides of the semi-rigid medium 3 close to the fixed objective lens 40. In embodiments where the objective lens 40 is an oil immersion type, piezoelectric pushers 50 may be located around the objective lens 40. In this way, the object 1 is axially scanned and the set of piezoelectric pushers 50 easily overcome viscous drag of the object 1 immersed within a liquid environment for refractive index matching. In an example where the semi-rigid medium 3 comprises a capillary tube or cell thread, its center can easily move about 40 microns (μm). In embodiments where the objective lens 40 is air immersion, resonant vibration may be used with fewer and smaller piezoelectric pushers 50 as actuators.

The piezoelectric pushers 50 may advantageously have reversible motion to allow the semi-rigid medium 3 to be rotated by external motors. Such piezoelectric pusher retraction of the sample actuator may be made to coincide with the stepper motor rotation 49. Retraction time may be limited to less than 5 ms.

Figure 5:
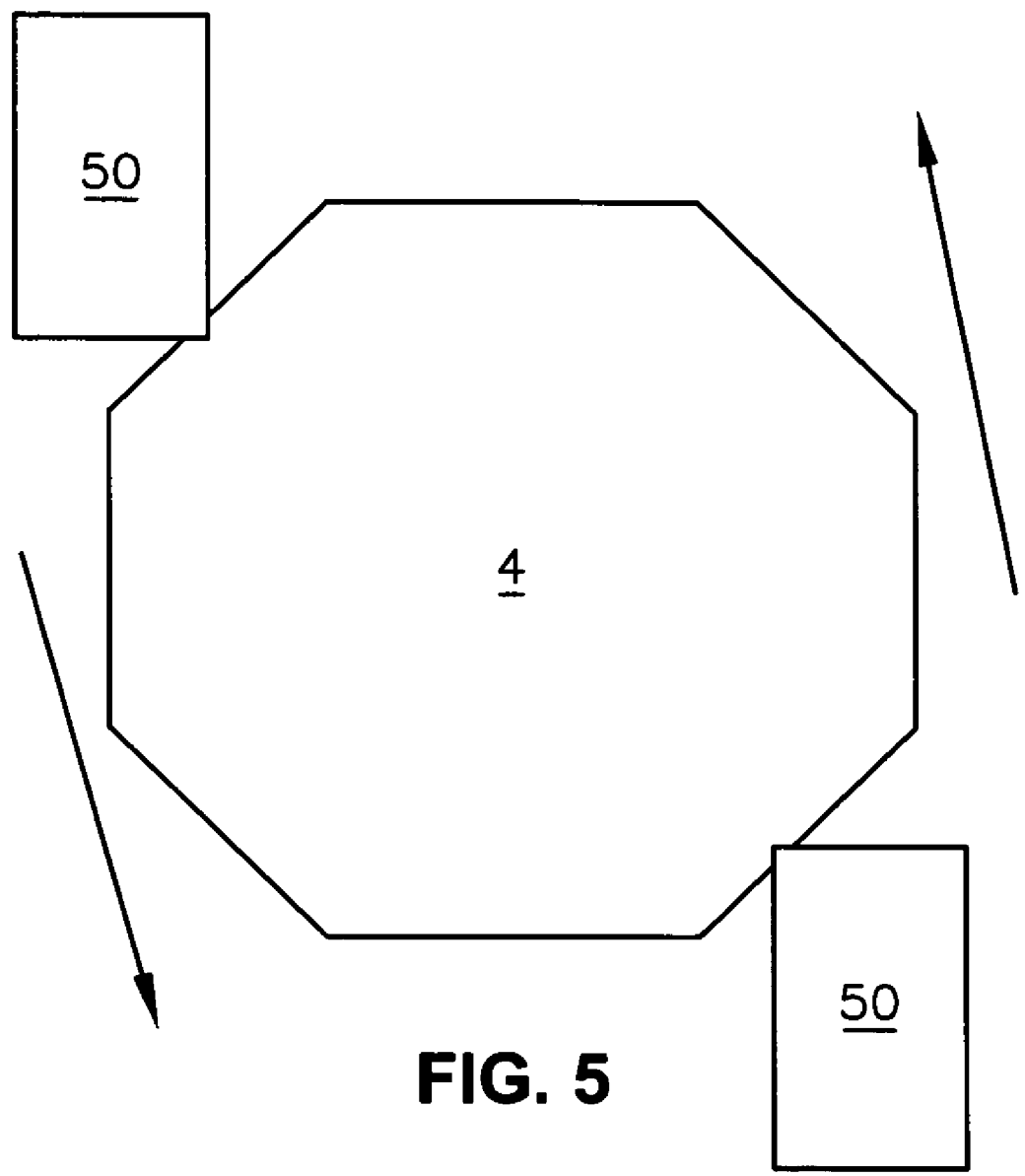
FIG. 5 schematically illustrates an example embodiment of the invention where a set of piezoelectric pushers move orthogonally in opposing directions from the central axis of the sample to rotate the sample.

Referring now to FIG. 5, there shown schematically is an example embodiment of the invention where a set of piezoelectric pushers 50 move orthogonally in opposing directions from the central axis of the semi-rigid medium 3. The net result of these opposing forces is to push the semi-rigid medium 3 at the central axis for scanning without introducing any rotation, about the central axis of the semi-rigid medium 3, while alternatively the net resultant force creates a torque that results in a small rotation. In such a configuration, external stepper motors may not be required for rotating the semi-rigid medium 3.

Another alternative embodiment of the system of the present invention scans an object embedded in a semi-rigid medium fast enough to maintain the object in continuous rotation by one or more external motors. At the same time piezoelectric pushers clamp, scan and release the sample. During clamping rotation under the objective lens is temporarily halted, with resultant strain being taken up by the torsional elasticity of specimen. When the piezoelectric pushers release the specimen, the torsional elasticity serves to rotate the sample for scanning at a subsequent rotational angle.

To image multiple cells within a sample, then either the line of cells must be advanced relative to the pseudoprojection apparatus, or the pseudoprojection apparatus must be moved. If the cells are held within a viscous gel within a capillary tube sample, then axial motion of the cells can be accomplished using, a continuous flow or a stopped-flow approach as used in flow cytometry systems or microfluidic systems. However, if the cells are held in a rigid cylindrical rod, such as a polymer thread or polymer beads, then the sample must be moved relative to the non-scanning objective lens. Another mechanism for mechanically fixing cells in a polymer thread is to freeze a liquid stream containing the cells. In one example embodiment, where specimens are embedded in a semi-rigid medium, the specimens may be pulled by a linear motor. In this way each object, such as a cell, is observed in turn within the fixed objective lens. A slightly more complex alternative requires moving the objective and condenser lenses axially along the sample using machine vision algorithms to locate and center the lens onto a cell.

Depending on the type of medium used to hold the specimen, alternative scanning methods and embodiments may be employed in accordance with this invention. For example, in the case where cells or cell beads are contained in a low-viscosity fluid, then electrostatic attraction or repulsion can be used to scan the specimen instead of piezoelectric pushers or the like.

Referring now to FIG. 3, a side view of a scanning apparatus 200 for optical tomography as contemplated by an alternate embodiment example of the current invention is shown. The scanning apparatus 200 includes a pair of synchronized stepper motors 5, a microscope objective 10, a pair of mounting fixtures 12, a specimen 14, and a pair of piezotubes 16. In one example embodiment the pair of stepper motors may be configured to operate as described in co-pending application 60097US to Fauver et al., entitled IMPROVEMENTS IN OPTICAL PROJECTION TOMOGRAPHY MICROSCOPE, the disclosure of which are incorporated herein by this reference.

In one example, the specimen 14 may comprise a rigid sample contained in a long thin cylinder, such as a microcapillary tube, that is rotated at the ends using the pair of microstepper motors 5. By using the mechanical gain of vibratory amplitude at resonance, piezoelectric tube actuators can be used on either end of the sample. Since a liquid medium is necessary for cylindrical samples, then the drag may reduce the amplitude below the required 40 to 50 microns for a single cell, and lower resonant frequencies may be required. If the objective lens is designed for air-immersion, then there is no index matching oil to dampen the motion. However, the surface of the cylindrical sample should be modified to have flat sides, thus requiring non-circular cross-sectional geometries of the sample, such as a square cross section, hexagonal, octagonal, etc. Such non-cylindrical outside geometries may be produced using extrusion methods for both optically clear materials, such as glass or polymer.

Referring now to FIG. 4, there illustrated is a top view of the alternate embodiment example scanning apparatus 200 for optical tomography as shown in FIG. 3. A vertical tube guide 17 may be used to restrict the sample within a viewing area under the objective 40 (as shown in FIG. 3). The piezotube actuator 16 has a split electrode that generates one-dimensional motion. The vertical guide 17 may contain a refractive index-matching medium.

Method for Pre-processing of Projection Images

Figure 6:
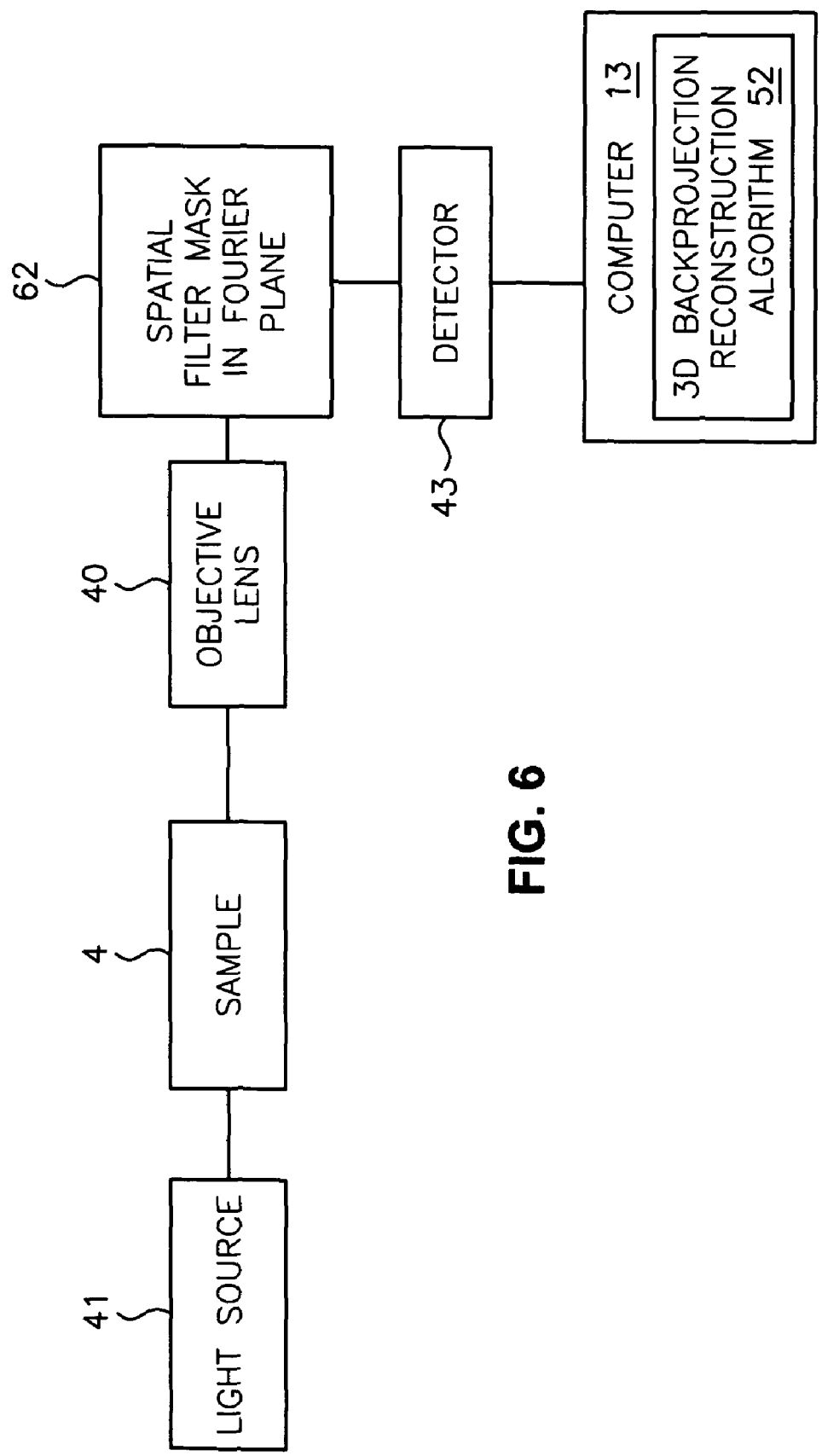
FIG. 6 schematically shows an example illustration of a high level block diagram of a multi-dimensional imaging system using the method and apparatus for pre-processing projection images as contemplated by the present invention.

The following explanation of the concept of the invention is provided to promote further understanding of the method of the invention for pre-processing of projection images. Referring to FIG. 6, there schematically shown is an example illustration of a high level block diagram of a multi-dimensional imaging system using the method and apparatus for pre-processing projection images as contemplated by the present invention. The multi-dimensional imaging system includes a light source 41, a portion of the sample 4, at least one objective lens 40 or equivalent optics, a spatial filter mask 62 in the Fourier plane, at least one detector 43, and a computer 13. In one example embodiment, the computer 13 may comprise a personal computer or workstation including an image analysis algorithm for producing three-dimensional images such as, for example, a tomographic backprojection reconstruction algorithm 52. The light source 41 generates light rays that illuminate the portion of the sample 4. Transmitted light rays are transmitted through the portion of the sample 4 and pass through objective lens 43. Objective lens 40 transmits back plane light rays onto a back focal plane so as to impinge on a spatial filter mask 62 located in the Fourier plane. Masked projection images from the portion of the sample 4 are transmitted from the spatial filter mask 62 to the detector 43. Projection imaging information from the detector 43 is transmitted to the computer 13. The spatial filter mask 62 may advantageously comprise, for example, a spatial filter having an optical density that compensates for the effects of optical system blurring, defocus blurring, reconstruction artifacts, and limited detector dynamic range.

The structure of the spatial filter mask 62 is determined in part by measuring the 3D point-spread function (PSF), preferably using a microsphere or a pinhole. By placing a camera in a Fourier plane of our optical system, and measuring the power spectrum as characterized by the magnitude of the spatial frequency components of a pseudo-projection of the microsphere or pinhole, a direct measurement of image degradation due to optical system limitations and out-of-focus blurring can be made.

Figure 8A:
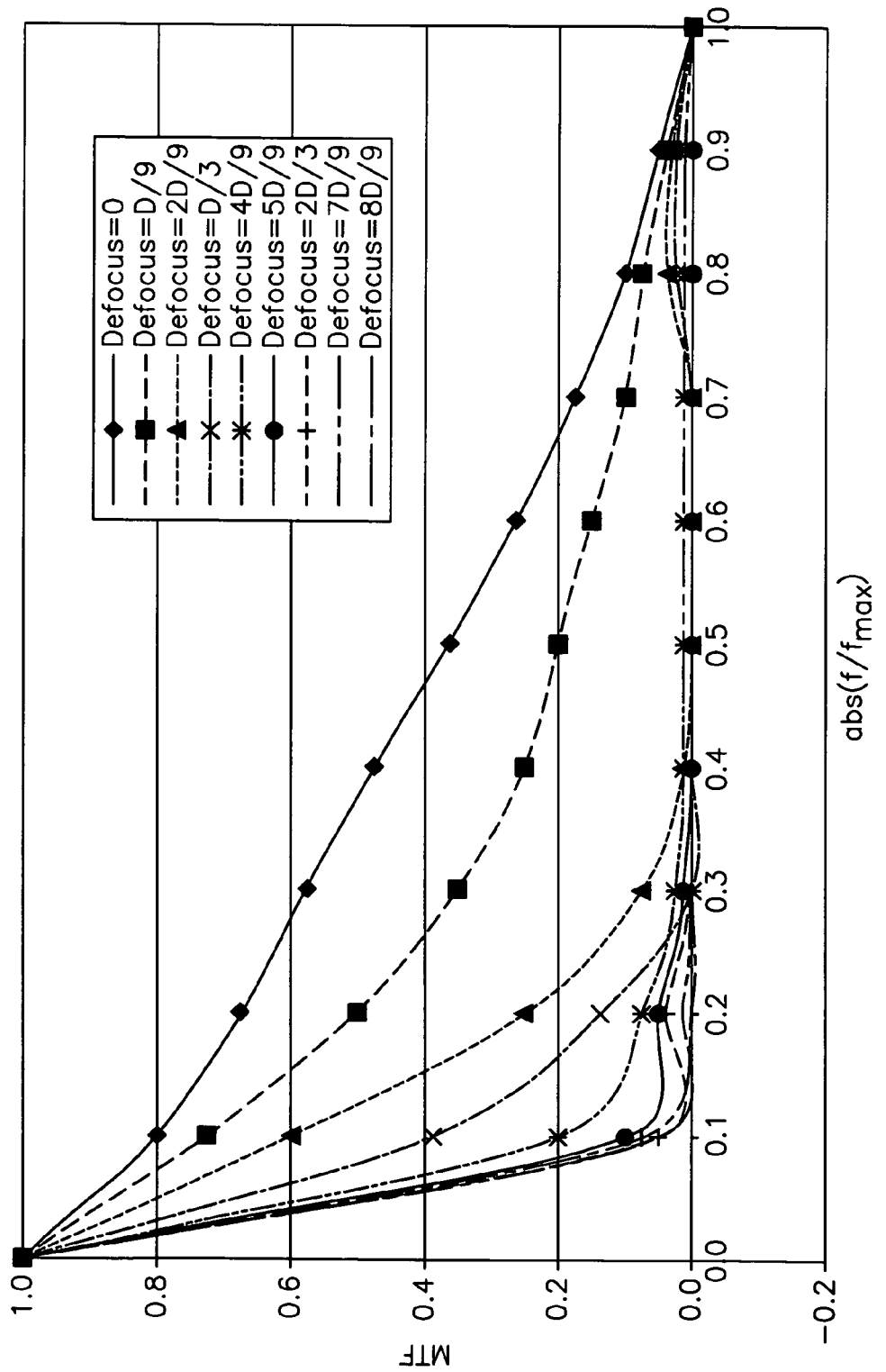
FIG. 8A-FIG. 8D graphically depict optical characteristics relating to the method of the invention including an example of how the modulation transfer function varies with defocus and with spatial frequency, and how its variation affect the spatial filter's attenuation characteristics.
Figure 8B:
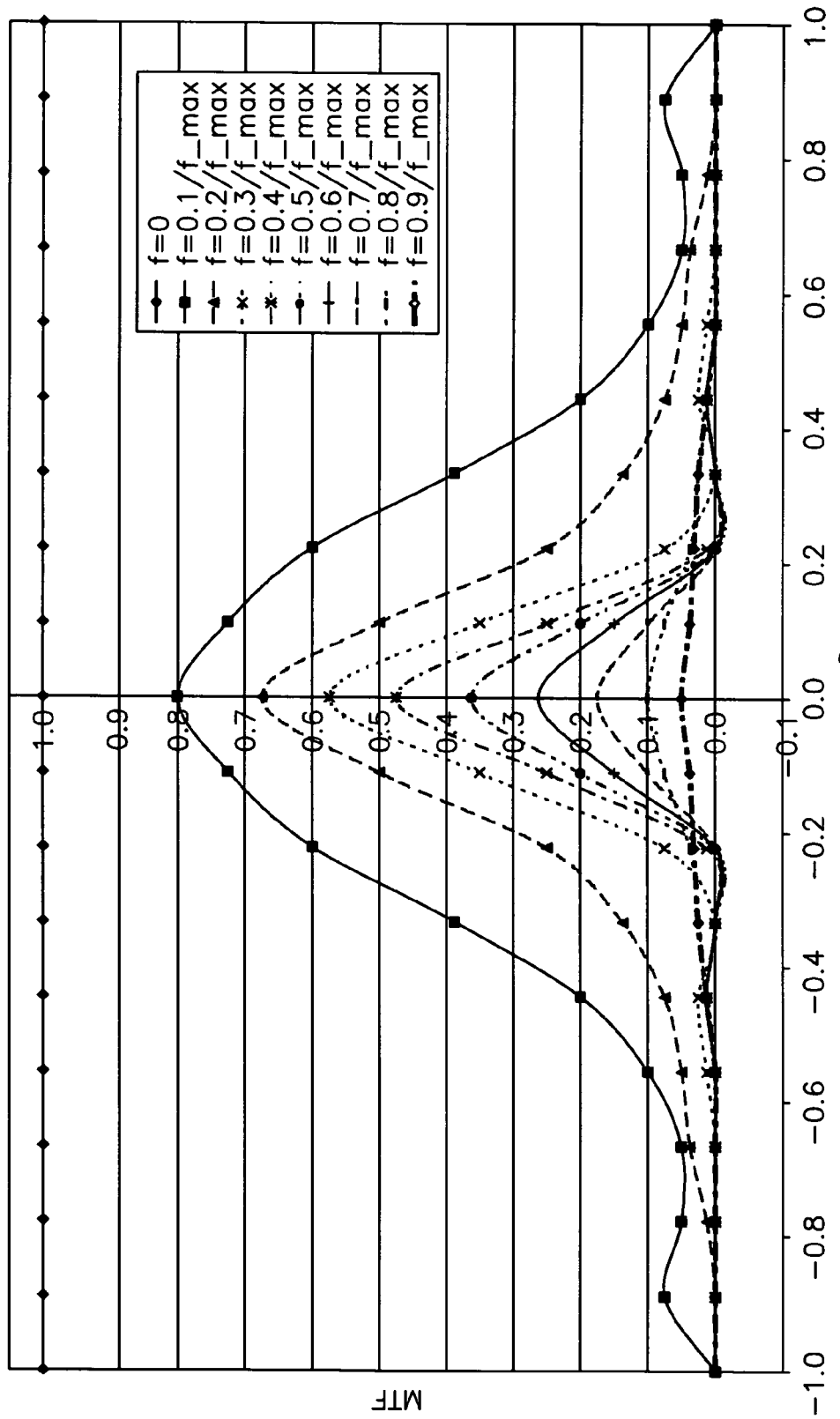

$S(z,f)$ is here defined as the power, at spatial frequency f of the object at elevation z. $G(\delta, f)$ is the MTF of the system at frequency f and defocus $\delta$; it is assumed to be non-negligible over a range $\pm\Delta$. FIG. 8A plots, in an example illustration, how the MTF, G, might vary with frequency relative to its maximum (diffraction-limited) frequency, $f_{max}$. In this example, the MTF is assumed to vary with the magnitude of the frequency, not with its direction, i.e., $G(\delta, f)=G(\delta,|f|)$. Note that the greater the defocus, the more rapidly the MTF rolls off with frequency. The same data is plotted in FIG. 8B, except that the MTF is now plotted against the amount of defocus relative to the maximum defocus, $\Delta$. In this example illustration, the MTF is assumed to be symmetric with the direction of the defocus, i.e., $G(\delta, f)=G(-\delta, f)$.

When a two-dimensional object, located at elevation z on the optical axis and having spatial frequency content $S(z,f)$, is defocused by an amount $\delta$, the spatial frequency content of the image captured by the detector is $S(z,f)G(\delta,f)$, where $G(\delta,f)$ is the MTF for spatial frequency f and defocus $\delta$. For a conventional microscopy image, the spatial frequency content of the acquired image, $I(z_0,f)$, is:

$$I(z_0, f) = \int_{z_0-\Delta}^{z_0+\Delta} G(z-z_0, f)S(z, f)dz \qquad (1)$$

In the above equation, the presence of non-zero values of $G(z,f)$ for $z \neq z_0$ is the source of blur. It gives rise to the appearance of out-of-focus features in a thick specimen, even in the absence of imaging system aberrations. Unfortunately, the functions, G(z,f) and S(z,f) are not separable without a priori knowledge of the object.

The spatial frequency content of the pseudo-projection at frequency f, P(f), is computed from the Fourier transform of the experimentally measured pseudo-projection, It is equivalent to the integration of many conventional 2D images over a range of elevations:

$$P(f) = \int_{z_1}^{z_2} I(z, f) dz \qquad (2)$$

$$= \int_{z_1}^{z_2} \int_{z-\Delta}^{z+\Delta} G(z'-z, f) S(z', f) dz' dz$$

$$= S(z, f) \otimes G(\delta, f)$$

where $\otimes$ denotes convolution operating along the optical (z) axis. Unfortunately, z-axis convolution cannot be performed without collecting and saving individual slices at each elevation, as it requires a priori knowledge of S(z,f).

Unlike Equation (1), Equation (2) is amenable to separation of the variables S(z,f) and G(z'−z,f). It can be expressed as the sum of three separate elevation regions, only one of which corresponds to a focal plane within the object itself:

$$P(f) = \left[\int_{z_1+\Delta}^{z_2-\Delta} S(z,f)dz \int_{-\Delta}^{\Delta} G(\delta,f)d\delta\right] + \left[\int_{z_1}^{z_1+\Delta} S(z,f)dz \right. \qquad (3)$$

$$\left. \int_{-\Delta}^{z-z_1} G(\delta,f)d\delta\right] + \left[\int_{z_2-\Delta}^{z_2} S(z,f)dz \int_{z_2-z}^{\Delta} G(\delta,f)d\delta\right]$$

If there are no object features outside the range covered in the first term in Equation (3), then the two regions covered by the second and third terms contain only transmitted light (f=0). This situation corresponds to the case when the object is physically present only within the elevation range from $z_1+\Delta$ to $z_2-\Delta$.

FIG. 7A illustrates a case in which the position of the objective lens 40 places the focal plane at $z_2$, so that the focal region 46, which covers the contrast-free (blank) volume in the range from $z_2-\Delta$ to $z_2+\Delta$, just reaches the upper elevation of the object 1. The light from this region contributes to the third term in Equation (3). Its inclusion in the pseudo-projection P(f) is zero-padding in the analog domain. By extending the range of the focal region 46 above and below the object 1, all focal planes in the object 1 receive equal weighting from the defocused MTF, G(δ,f).

FIG. 7B depicts the system when the focal plane is at the uppermost elevation of the object 1, $z_2-\Delta$, so that the focal region 46 includes both a portion of the object 1 and the blank region above it. This focal position represents the boundary of the first term and the third term in Equation (3).

FIG. 7C shows the focal plane within the elevation that includes the object 1; thus it contributes to the first term in Equation (3), even though the focal region 46 extends below the object 1 and into the blank volume below it.

If, for clarity of understanding, the MTF is assumed to be symmetric, i.e., G(δ)=G(−δ), then:

$$P(f)=\Psi(f)\Omega(f)+\Psi(f)S_{trans}\varepsilon(f)\Delta \qquad (4)$$

where $F_{trans}$ is the transmitted light level and $$\varepsilon(f) = \begin{Bmatrix} 1(f=0) \\ 0(f \neq 0) \end{Bmatrix} \qquad (5a)$$

$$\Psi(f) = \int_{-\Delta}^{\Delta} G(\delta, f) d\delta \qquad (5b)$$

$$\Omega(f) = \int_{z_1+\Delta}^{z_2-\Delta} S(z, f) dz \qquad (5c)$$

Figure 8C:
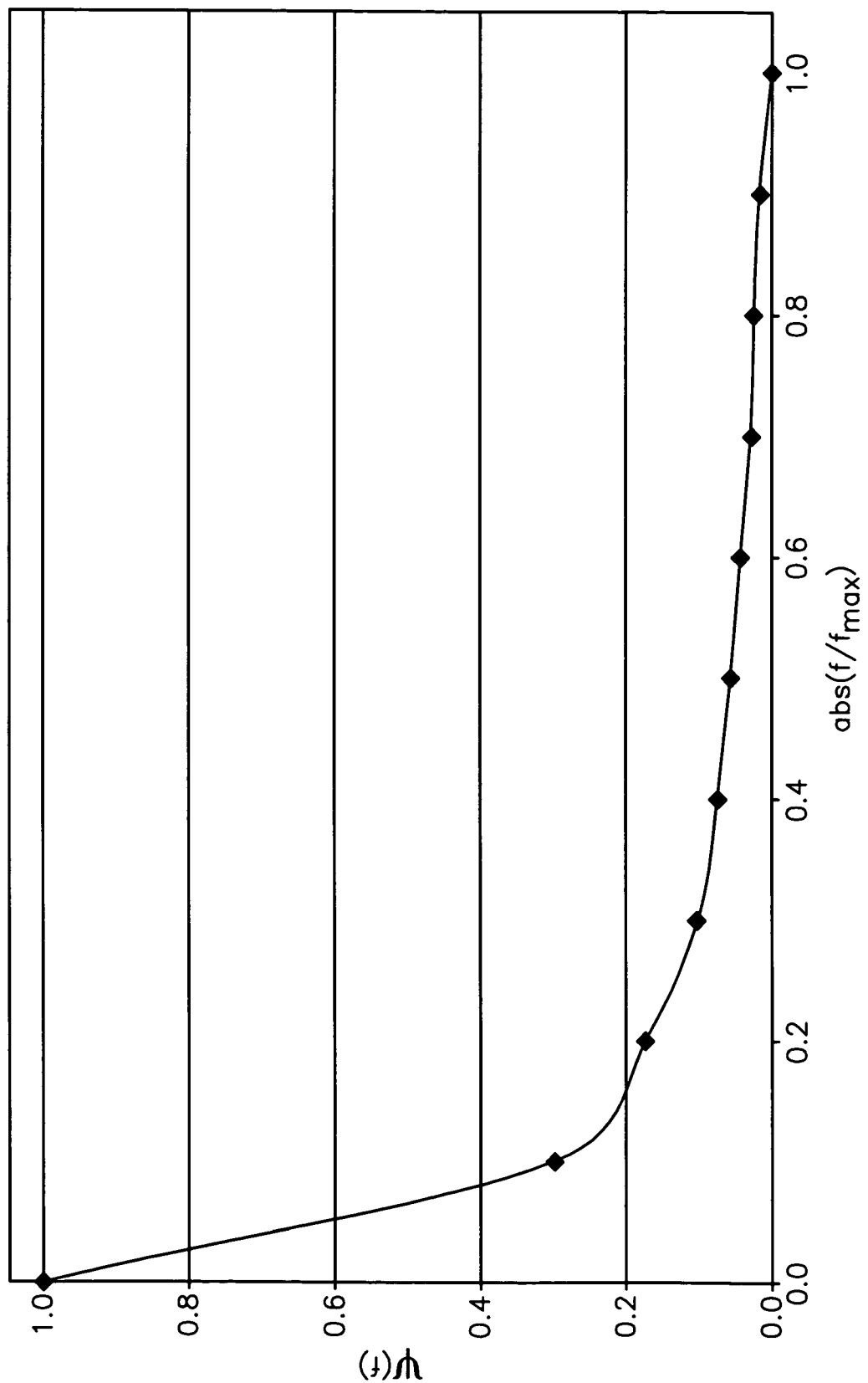

If the integrated MTF, Ψ(f), is known, then P(f) can be normalized to obtain the deblurred spectral power, Ω(f). Normalizing by Ψ(f) at each spatial frequency and applying a Fourier transform yields the blur-free pseudo-projection. FIG. 8C plots values of Ψ(f), using the hypothetical values of G(δ, f) shown in FIGS. 8A and 8B.

With the completion of the aforesaid steps, each spatial frequency in the object has an equal chance of reaching the detector. In other words, the MTF is flat across the frequency spectrum. This helps in the measurement, since it reduces the range of intensities that the camera must acquire. It should be noted that, since the range of integration is much larger than the diameter of the microsphere, the pseudo-projection's power spectrum, P, will contain an excess of DC. By sharply attenuating the DC component in the deconvolution filter, a more precise measurement of each point in the power spectrum can be obtained, since the detector has a limited bit depth (dynamic range).

Image degradation due to lateral smearing and lateral blurring are accounted for by applying Ψ(f), and dynamic range limitations are made less critical for by additional attenuation of the DC (f=0) frequency component. However, still to be obtained is the minimized range of intensities, since the power spectrum distribution of the desired signal is expected to fall off with increasing frequencies. The degree of rolloff cannot be determined a priori. However, it so happens that the 3D reconstruction algorithm includes filtered backprojection that requires that a high-pass filter (also referred to herein as a ramp filter), having a transmittance T(f)=f, be applied in the frequency domain to compensate for reconstruction artifacts, the remaining source of errors. Application of a ramp filter in the frequency domain also tends to amplify noise, since truly random noise is present with the same spectral power at all frequencies (white noise). Thus, the ramp filter is, preferentially, modified to provide a flattening or a roll-off at high spatial frequencies. One way of creating such a quasi-ramp filter, T'(f), is to multiply the ramp filter, T(f), by, for example, a Hanning filter, yielding:

$$T'(f)=f\cdot[1+\cos(\pi f/f_{max})] \qquad (6)$$

Other functional forms of T'(f) may also be used without departing from the scope of the invention. The optimal form of the quasi-ramp filter, T'(f), can be determined empirically by examining reconstructions of a test target to determine frequencies where noise predominates.

The result of the foregoing considerations is that the fabricated spatial filter exhibits an optical density corresponding to:

$$OD(f) = H - \log\left[\frac{\Psi(f) + \varepsilon(f)k}{T'(f)}\right] \qquad (7)$$

The constant term, k, is chosen to be as large as possible, so that the signal attenuation at f=0 becomes very large. In this manner, the DC component received by the detector is minimized. Since the DC component contributes only a bias term to the image, the light attenuation can be arbitrarily large, resulting, in the most extreme case, a contrast reversal in the image, which can easily be corrected.

The transmittance of the filter is $10^{-(OD)}$ or $$\left[\frac{T'(f)}{\Psi(f)+\varepsilon+(f)k}\right] \cdot 10^{-H}.$$

Figure 8D:
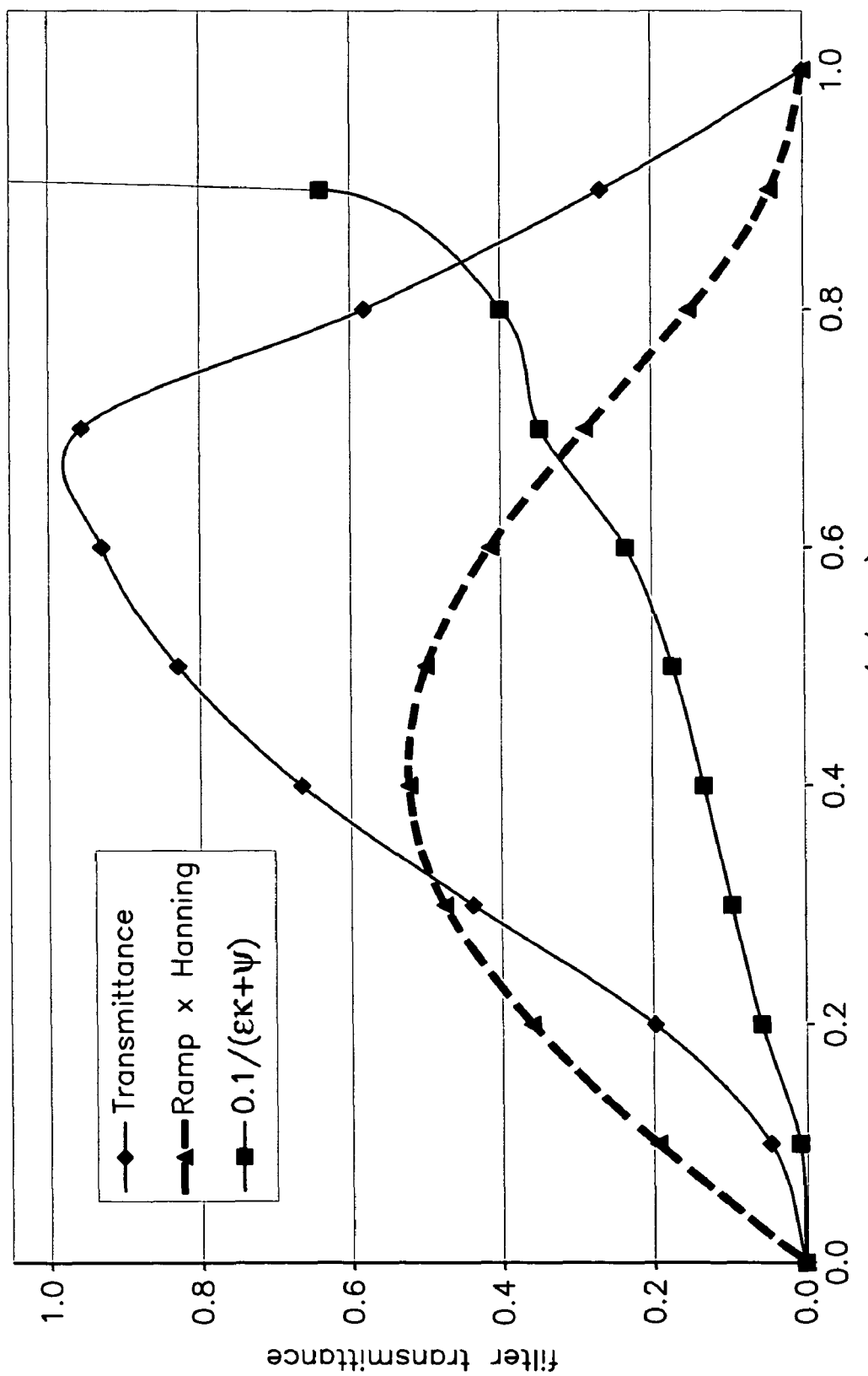

The small positive constant term, H, is included to allow for attenuation due to the filter substrate—even in those portions of the filter where the bracketed term equals one, it is likely that the filter's transmittance will be slightly less than one. FIG. 8D depicts an example of a spatial filter's transmittance, including a ramp filter multiplied by a Hanning filter, and using the hypothetical values of $G(\delta, f)$ shown in FIGS. 8A and 8B. It also plots the separate transmittance contributions of the quasi-ramp filter and of the inverse of $\Psi+\epsilon\kappa$, obtained using the data from FIGS. 8A and 8B. The value of H in the example is 0.02; its non-zero value ensures that ensures that the transmittance does not exceed one.

The optical density should be radially symmetric, as long as azimuthally-dependent smearing, such as that due to astigmatism in the optical system, is not present.

The above description applies to the case of plane-wave illumination, i.e., when the condenser's numerical aperture (NA) is zero, and the illumination is monochromatic. For this special case, the location of each spatial frequency f is $r(f)=F \tan(f\lambda)$, where F is the focal length of the lens, the wavelength is $\lambda$, and r is measured from the center of the aperture.

In one embodiment the optical system contemplated by the method of the invention uses broadband illumination and, preferably, as wide a condenser NA as possible, and a bandpass filter with a passband no greater than ten nanometers wide. The bandpass filter makes it feasible to neglect the effect of the wavelength on r(f).

As long as the condenser NA is much less than the objective NA, useful spatial filtering can still be obtained. In the presence of a non-zero condenser NA, each spatial frequency maps to a region around r(f). Thus, the mapping of r(f) must be convolved with the condenser function, C, to obtain the mapping in the presence of a condenser NA, $r_c(f)$:

$$r_c(f)=r(f) \otimes C \qquad (8)$$

The DC component of C, C(0), can be measured by acquiring the image in the Fourier plane when there are no objects present in the field of view. C can be determined by comparing the Fourier spectrum of the pseudo-projections obtained at specific condenser settings with the one acquired for NA=0:

$$[C]_q = P_{NA=q}/P_{NA=0} \qquad (9)$$

Furthermore, when the deconvolution function is measured, its convolution with C is already included. As a result:

$$\int_{-\Delta}^{\Delta} G_{NA=q}(\delta, f) d\delta = \frac{P_{NA=q}}{\int_{z_1+\delta}^{z_2-\delta} S(\delta, z)_{NA=q} dz} \qquad (10)$$

$$= \frac{P_{NA=q}}{P_{NA=0}} \int_{-\Delta}^{\Delta} G_{NA=0}(\delta, f) d\delta$$

In Equation (10), $S(\delta,z)$ may be calculated for an ideal two-dimensional object, such as disk or a pinhole. The end result is that the spatial filter's optical density is equal to the convolution of the condenser function, C, with $OD_{NA=0}$, the desired optical density for a condenser NA of zero. The result is $$OD_{NA=q} = OD_{NA=0}(x) C \qquad (11)$$

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment, devices and algorithms, and that various modifications, both as to the equipment details and operating procedures, may be accomplished without departing from the true spirit and scope of the present invention. The term "comprising" as used herein is to be construed in an inclusive sense such that the claims include essential features of the inventions, but do not exclude features not claimed.

What is claimed is:

1. A scanning method for scanning samples of biological cells using optical tomography comprising the steps of:
    concentrating and enriching a cell sample; staining the cell sample; isolating and purifying cells from the cell sample; injecting the isolated and purified cells into a liquid or gel medium to produce a cell mixture;
    injecting the cell mixture into a capillary tube until a cell appears in a field of view of a pseudo-projection viewing subsystem;
    acquiring at least one pseudo-projection image of at least one object that is in the field of view using the pseudo-projection viewing subsystem, the pseudo-projection viewing subsystem comprising a fixed objective lens, a detector, and a plurality of mechanical scanning components that are mounted to engage opposing sides of the capillary tube proximate to the fixed objective lens so as to vibrate the capillary tube to enable the at least one object to be axially scanned by the fixed objective lens, wherein each pseudo-projection image thus formed comprises an integration of focal plane images acquired during a single exposure of the detector;
    rotating the capillary tube about a tube axis to generate additional pseudo-projection images at different views using the pseudo-projection viewing subsystem;
    determining whether a pseudo-projection data set is complete and, if not, repeating the above steps of injecting into the field of view, acquiring at least one pseudo-projection image, and rotating the capillary tube to generate additional pseudo-projection images of another object;
    correcting the pseudo-projection images for errors to produce corrected pseudo-projection image information; and from the corrected pseudo-projection image information computing filtered backprojection information for 3D reconstruction.

2. The scanning method of claim 1 further comprising the steps of: analyzing images of the 3D reconstruction; and viewing the images.

3. The scanning method of claim 1 wherein the step of injecting the cell mixture into a capillary tube comprises using a stopped-flow method.

4. The scanning method of claim 3 wherein the cell mixture comprises at least one cell embedded in a liquid having a viscosity >1 million cps.

5. The scanning method of claim 3 wherein the cell mixture comprises at least one cell embedded in a thixotropic gel.

6. The scanning method of claim 1 wherein the plurality of mechanical scanning components comprise: a pair of piezotubes, wherein the piezotubes are coupled at opposing ends of the capillary tube and configured to vibrate the capillary tube.

7. The scanning method of claim 1 wherein the step of correcting the pseudo-projection images further comprises the steps of illuminating a portion of the cell mixture such that light rays passing through the portion of the cell mixture pass through a Fourier plane of the fixed objective lens; using a spatial filter mask in the Fourier plane to filter light rays projecting through the objective lens to produce spatially filtered light; and reconstructing 3D images from the spatially filtered light.

8. The scanning method of claim 7 wherein the spatial filter mask has a spatially varying optical density, $OD_{NA=q}$, which incorporates a quasi-ramp filter, said quasi-ramp filter functioning as a high-pass filter at low spatial frequencies.

9. A scanning system for scanning a sample, wherein the sample includes a series of objects in a container, the scanning system comprising:
    a pseudo-projection viewing subsystem for imaging the objects, wherein the pseudo-projection viewing subsystem includes a detector and a fixed objective lens; and
    a plurality of mechanical scanning components mounted to engage opposing sides of the sample proximate to the fixed objective lens so as to vibrate the sample to allow the sample to axially scanned by the fixed objective lens;
    wherein the pseudo-projection viewing subsystem is configured to produce at least one pseudo-projection image of the objects in a field of view of the pseudo-projection viewing subsystem, each pseudo-projection image comprising an integration of focal plane images acquired during a single exposure of the detector.

10. The scanning system of claim 9 wherein the plurality of mechanical scanning components comprise piezoelectric pushers.

11. The scanning system of claim 9 wherein the sample comprises a series of objects embedded in a semi-rigid medium.

12. The scanning system of claim 11 wherein the semi-rigid medium is selected from the group consisting of a polymer thread, a capillary tube, cell beads and a frozen liquid stream.

13. The scanning system of claim 9 further comprising at least one stepper motor coupled to the sample for rotating the sample.

14. The scanning system of claim 13 wherein the at least one stepper motor operates in cooperation with the plurality of mechanical scanning components to allow scanning of the sample through multiple angles.

15. The scanning system of claim 9 wherein the fixed objective lens comprises an oil immersion lens and piezoelectric pushers are located around the fixed objective lens, so that the sample is immersed within a liquid environment for refractive index matching.

16. The scanning system of claim 9 wherein the fixed objective lens comprises an air immersion lens.

* * * * *